United States Patent [19]
Sato et al.

[11] Patent Number: 5,917,684
[45] Date of Patent: *Jun. 29, 1999

[54] MAGNETIC HEAD APPARATUS, TAPE CARTRIDGE AND RECORDING/ REPRODUCING APPARATUS FOR INCREASING TAPE STABILITY

[75] Inventors: Takashi Sato; Kengo Saito; Osamu Koizumi; Masanori Sato, all of Miyagi, Japan

[73] Assignee: Sony Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,398

[22] Filed: May 9, 1996

[30] Foreign Application Priority Data

May 22, 1995 [JP] Japan .................................. 7-122609

[51] Int. Cl.⁶ .................................................. G11B 23/087
[52] U.S. Cl. ........................................................ 360/130.21
[58] Field of Search ............................. 360/130.21, 132; 242/341, 346, 347

[56] References Cited

U.S. PATENT DOCUMENTS

| | | | |
|---|---|---|---|
| 3,078,352 | 2/1963 | Fay | 360/84 |
| 3,151,796 | 10/1964 | Lipschutz | 242/615 |
| 4,003,091 | 1/1977 | Wright | 360/102 |
| 5,253,135 | 10/1993 | Hamana | 360/130.21 |
| 5,257,747 | 11/1993 | Mann | 360/132 |
| 5,287,240 | 2/1994 | Koizumi et al. | 360/132 |
| 5,289,330 | 2/1994 | Wade | 360/122 |
| 5,357,390 | 10/1994 | Vollmann | 360/130.21 |

FOREIGN PATENT DOCUMENTS

| | | |
|---|---|---|
| 1562680 | 4/1969 | France . |
| 56-137 512 | 10/1981 | Japan . |
| 58-188 336 | 11/1983 | Japan . |
| 60-164 947 | 8/1985 | Japan . |
| 61-194 667 | 8/1986 | Japan . |
| 1-207 905 | 12/1989 | Japan . |
| 2-306 409 | 12/1990 | Japan . |
| 5-020 625 | 1/1993 | Japan . |
| 2 216 710 | 10/1989 | United Kingdom . |

*Primary Examiner*—David D. Davis
*Attorney, Agent, or Firm*—Rader, Fishman & Grauer; Ronald P. Kananen

[57] ABSTRACT

A magnetic head device has a base portion 3, and a magnetic head element 4 protuberantly formed on a major surface of the base portion 3 and having a magnetic core with a magnetic gap g. A magnetic tape controller 5 surrounding the magnetic head element 4 and contacted with a magnetic tape 2 is provided on a major surface of the base portion 3. The magnetic tape controller has a magnetic tape attracting aperture 5A for exposing a magnetic tape slide surface 4B of the magnetic head element 4 to outside. The recording/reproducing characteristics for the magnetic tape are stabilized and data errors are prevented from occurring.

12 Claims, 10 Drawing Sheets

MAGNETIC HEAD APPARATUS, TAPE CARTRIDGE AND RECORDING/REPRODUCING APPARATUS FOR INCREASING TAPE STABILITY

BACKGROUND OF THE INVENTION

1. Field of the Invention

This invention relates to a magnetic head apparatus for applying a magnetic field to a magnetic tape by being contacted with the running magnetic tape, and a tape cartridge used for data backup for a personal computer or an office computer. The invention also relates to a recording/reproducing apparatus provided with the magnetic head apparatus and loaded with the tape cartridge.

2. Description of the Related Art

The recording/reproducing apparatus is comprised of a driving apparatus, connected to a personal computer or an office computer, and a data cartridge loaded thereon. The driving apparatus sucks data signals stored in, for example, a memory of a main body portion of a computer and records the data signals recorded on the recording medium in the data cartridge, such as a magnetic tape, magnetic disc or a magneto-optical disc. The driving apparatus also transmits the data signal recorded in the recording medium in the data cartridge to, for example, a memory of the main body portion of the computer for reproduction.

A magnetic head 51, provided in the driving apparatus, has a pair of magnetic core halves 52, 53 bonded as one to each other with a front gap g1 and a back gap g2 as a boundary, as shown in FIG. 1. The abutment surfaces 52b, 53b of the magnetic core halves 52, 53 are formed respectively with track width control grooves 54, 55 into which fused glass 56 is charged for bonding the magnetic core halves together.

The magnetic head 51 has a winding slot 57 for coil winding on an abutment surface 52i aof a pair of magnetic core halves 52, 53 in order to permit winding of a coil, not shown. The magnetic core halves 52, 53 of the magnetic head 51 are formed with winding guide slots 58, 59 on the opposite sides thereof with respect to the winding slot 57 for assisting in the coil winding.

Problem to be Solved by the Invention

With the data cartridge 51, constructed as described above, if a data cartridge 61 is loaded on a driving apparatus for constituting a recording/reproducing apparatus, as shown in FIG. 2, the magnetic head 51 is intruded into a recording/reproducing aperture 62 provided in the data cartridge 61 for recording or reading data signals on or from a magnetic tape 63 housed within the data cartridge 61. With the magnetic head 51 thrusting the magnetic tape 63 of the data cartridge 61, the tape tension, which is a resistant force of the magnetic tape 63, is applied to the magnetic head 51. As the take-up ratio of the magnetic tape 63 by a tape take-up reel housed within the data cartridge 61 is increased, the tape tension is gradually increased with frequent small-amplitude oscillations.

If the tape tension of the magnetic tape 63 is larger and the oscillations in the direction of tension, tape width and tape running are of smaller amplitudes, the magnetic head 51 is optimally contacted with the magnetic tape 63 to assure stable recording/reproduction.

However, since the tape tension is varied with the take-up ratio of the magnetic tape 63 by the tape take-up reel, not shown, on the side of the data cartridge 61, the contact pressure of the magnetic tape 63 with the magnetic head is changed when the tape tension of the magnetic tape 63 is decreased or oscillations of the magnetic tape 63 in the direction of tape tension or width and in the tape running direction are increased, thus lowering an output voltage of data signals to be recorded or reproduced and producing data errors.

For overcoming this problem, it may be contemplated to raise the dimensional accuracy of mechanical components making up a tape supply reel and a tape take-up reel housed within the data cartridge 61, such as a reel hub, for thereby prohibiting oscillations of the magnetic tape 63 in the direction of tape tension or width and in the tape running direction during tape running.

However, since these mechanical components of the data cartridge 61 are fabricated by resin molding, it is impossible to improve dimensional accuracy further, such that the magnetic tape 63 cannot be run in stability and data errors cannot be prevented from occurrence.

SUMMARY OF THE INVENTION

It is therefore an object of the present invention to provide a magnetic head apparatus, a tape cartridge and a recording/reproducing apparatus whereby magnetic tape recording/reproduction may be improved in stability and data errors may be positively prevented from occurrence.

In one aspect, the present invention provides a magnetic head apparatus including a base portion, a magnetic head element protuberantly formed on one major surface of the base portion and having a magnetic core with a magnetic gap, magnetic tape controlling means formed on one major surface of the base portion for surrounding the magnetic head element and for being contacted with a magnetic tape, and a magnetic tape attracting aperture formed in the magnetic tape controlling means for exposing a tape slide surface of the magnetic head element to outside.

In another aspect, the present invention provides a magnetic head device including a base portion for closing from outside a magnetic tape attracting aperture of a tape cartridge having a cartridge main body portion made up of an upper cartridge half and a lower cartridge half, a pair of tape reels rotatably mounted in the cartridge main body portion and a magnetic tape wound about these tape reels, and magnetic tape controlling means provided on one side of the cartridge main body portion for being contacted with the magnetic tape. The magnetic tape attracting aperture is formed in the magnetic tape controlling means for exposing the magnetic tape. The magnetic head device also includes a magnetic head element protuberantly formed on a major surface of the base portion and having a magnetic core with a magnetic gap, and a tape slide end surface of the magnetic head element being intruded via the magnetic tape attracting aperture formed in the tape cartridge.

In yet another aspect, the present invention provides a tape cartridge including a cartridge main body portion made up of an upper cartridge half and a lower cartridge half, a pair of tape reels rotatably mounted in the cartridge main body portion and a magnetic tape wound about these tape reels, and magnetic tape controlling means provided on one side of the cartridge main body portion for being contacted with the magnetic tape. The magnetic tape controlling means has a magnetic tape attracting aperture via which a magnetic tape slide surface of a magnetic head element of the magnetic head device having a base portion and a magnetic core formed on a major surface of the base portion with a magnetic gap is intruded inwardly and which is closed by the base portion of the magnetic head device.

In still another aspect, the present invention provides a recording/reproducing apparatus including a magnetic head device having a base portion and a magnetic head element protuberantly formed on a major surface of the base portion and having a magnetic core having a magnetic gap, a tape cartridge having a cartridge main body portion made up of an upper cartridge half and a lower cartridge half, a pair of tape reels rotatably mounted in the cartridge main body portion and a magnetic tape wound about these tape reels, and magnetic tape controlling means provided on one side of the cartridge main body portion for being contacted with the magnetic tape. The magnetic tape controlling means has a magnetic tape attracting aperture via which a magnetic tape slide surface of the magnetic head element of the magnetic head device is intruded and which is closed by the base portion of the magnetic head device.

With the above-described magnetic head device of the present invention, the magnetic tape controller contacts the magnetic tape and the magnetic tape attracting aperture is closed by the magnetic tape. As the magnetic tape travels, the magnetic tape attraction aperture attracts the magnetic tape so that the magnetic tape slide surface of the magnetic head element is contacted with the magnetic tape. By the attraction of the magnetic tape by the magnetic tape attracting aperture, the oscillations of the magnetic tape in the direction of tape tension and tape width and in the tape running direction are attenuated. By the tape slide surface of the magnetic head element being contacted with the magnetic tape, data signals may be recorded on or read out from the magnetic tape reliably.

With the magnetic head device of the present invention, the magnetic head element is intruded into the magnetic tape attraction aperture formed in the tape cartridge. By the base portion being contacted with the magnetic tape controller of the tape cartridge, the magnetic tape attracting aperture of the tape cartridge is closed from outside. During running of the magnetic tape on the tape cartridge, the magnetic tape attracting aperture in the tape cartridge attracts the magnetic tape so that the magnetic tape slide surface of the magnetic head element is contacted with the magnetic tape. By the attraction of the magnetic tape by the magnetic tape attracting aperture in the tape cartridge, the oscillations of the magnetic tape in the direction of tape tension and tape width and in the tape running direction are attenuated. Data signals may be recorded on or read out from the magnetic tape by the magnetic head element having its tape slide surface contacted with the magnetic tape.

With the tape cartridge according to the present invention, the magnetic head element of the magnetic head device is intruded into the magnetic tape attracting aperture. By the magnetic tape controller being contacted by the base portion of the magnetic head device, the magnetic tape attracting aperture is closed from outside. During running of the magnetic tape, the magnetic tape attraction aperture attracts the magnetic tape so that the magnetic tape is contacted by the tape slide surface of the magnetic head element. By the attraction of the magnetic tape by the magnetic tape attracting aperture in the tape cartridge, the oscillations of the magnetic tape in the direction of tape tension and tape width and in the tape running direction are attenuated in the tape cartridge. Data signals may be recorded on or read out from the magnetic tape by the magnetic head element having its tape slide surface contacted with the magnetic tape.

With the recording/reproducing apparatus according to the present invention, the magnetic head element of the magnetic head device is intruded into the magnetic tape attracting aperture in the tape cartridge. By the magnetic tape controller of the tape cartridge being contacted by the base portion of the magnetic head device, the magnetic tape attracting aperture is closed from outside. During running of the magnetic tape, the magnetic tape attraction aperture attracts the magnetic tape so that the magnetic tape is contacted by the tape slide surface of the magnetic head element. By the attraction of the magnetic tape by the magnetic tape attracting aperture in the tape cartridge, the oscillations of the magnetic tape in the direction of tape tension and tape width and in the tape running direction are attenuated with the recording/reproducing apparatus. Data signals may be recorded on or read out from the magnetic tape by the magnetic head element having its tape slide surface contacted with the magnetic tape.

DESCRIPTION OF THE PREFERRED EMBODIMENTS

Figure 1:
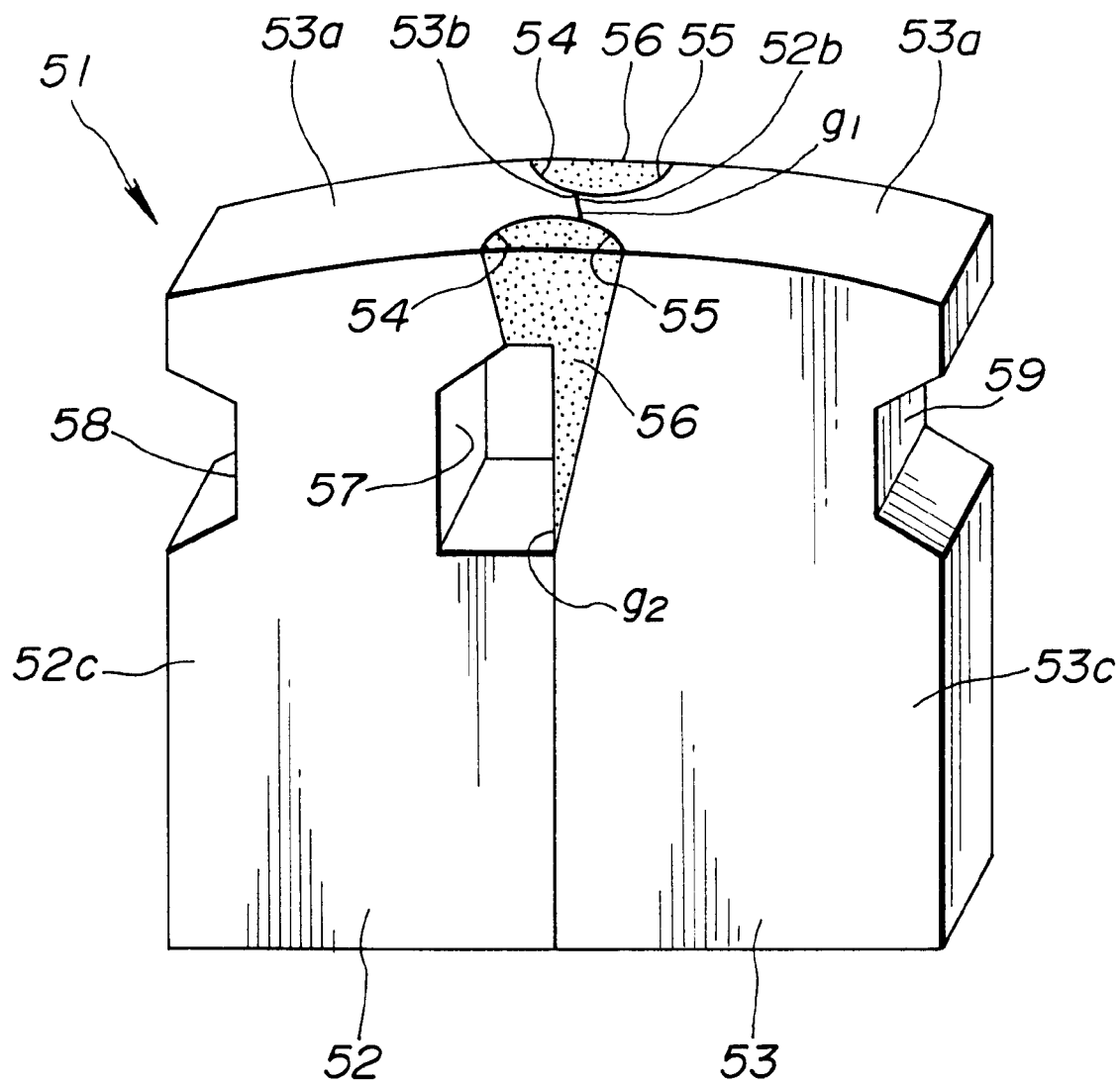
FIG. 1 is a perspective view showing a conventional magnetic head.
Figure 2:
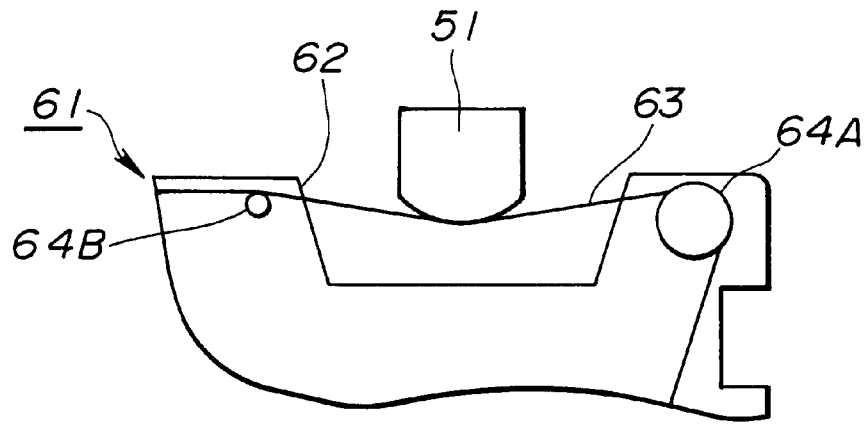
FIG. 2 is a schematic plan view showing the state of contact of the magnetic head with the magnetic tape.
Figure 3:
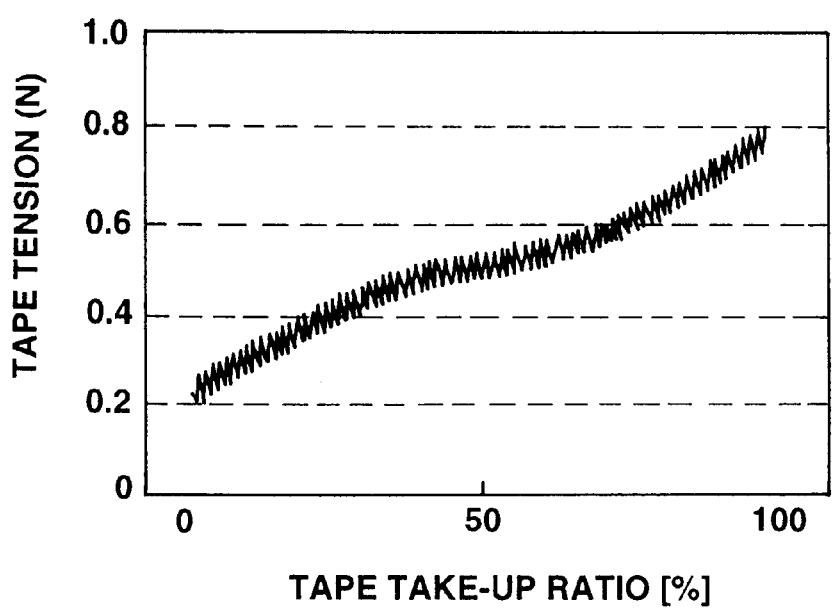
FIG. 3 is a graph showing tape tension of the magnetic tape with respect to the magnetic head.
Figure 4:
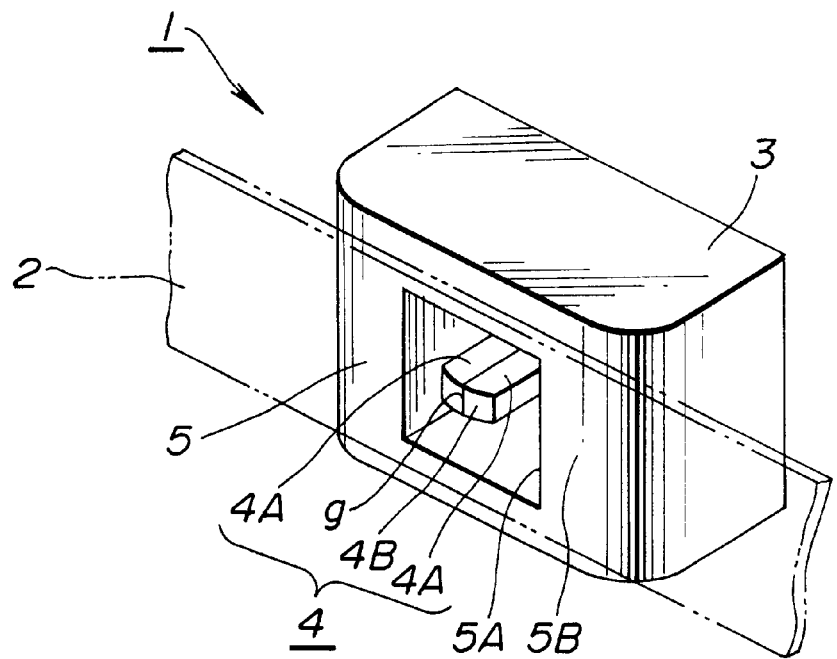
FIG. 4 is a perspective view showing a magnetic head apparatus according to a first embodiment of the present invention.

Referring to the drawings, preferred embodiments of the present invention will be explained in detail. The magnetic head apparatus, according to a first embodiment of the present invention, is mounted on a driving apparatus connected to, for example, a computer for sucking up or feeding back data signals stored in a memory of a main body portion, as shown in FIGS. 4 to 7.

The magnetic head apparatus 1 includes a base portion 3, a magnetic head element 4 protuberantly formed on a major surface of the base portion 3, and a magnetic tape controller 5 formed integrally with a major surface of the base portion 3 for being contacted with the magnetic tape 2. The base portion 3 is formed of a non-magnetic material substantially as a parallelpipedic member. The base portion 3 has a height larger than the width of the magnetic tape 2 and is of a size large enough to be intruded into the recording/reproducing aperture of a disc cartridge, not shown.

The magnetic head element 4 has a pair of magnetic core halves 4A, 4A formed of a magnetic material, such as sendust, permalloy, ferrite or amorphous. The magnetic core halves 4A, 4A of the magnetic head element 4 are formed symmetrically transversely with the abutment surfaces thereof as a boundary surface and are bonded together on the abutment surfaces for completing a closed magnetic path. The magnetic head element 4 has a magnetic gap g on the abutment surfaces of the magnetic core halves 4A, 4A for operating as a recording/reproducing gap. The magnetic head element 4 has a magnetic tape slide end surface 4B ground for having contact with the magnetic tape 2.

A thin sheet of a gap spacer, formed of a non-magnetic material, such as titanium or beryllium copper, may be interposed in the magnetic gap g of the magnetic head element 4 for increasing the magnetic field intensity.

The magnetic tape controller 5 is formed of a non-magnetic material as a substantially rectangular plate of substantially the same shape and size as the base portion 3. The magnetic tape controller 5 has a magnetic tape attracting opening 5A of a substantially rectangular shape for exposing the magnetic tape slide end surface 4B of the magnetic head element 4 to outside.

The magnetic tape attracting opening 5A has an inner size larger than the outer size of the magnetic head element 4 and a height equal to or smaller than the width of the magnetic tape 2. The magnetic tape attracting opening 5A has a depth slightly larger than the length from the proximal end to the distal end of the magnetic head element 4 and is set so that the magnetic head element 4 will be protruded to an optimum extent in agreement with the recording frequency or the coercive force Hc of the magnetic tape 2. The magnetic tape attracting opening 5A has a height, width and depth of, for example, 4 mm, 2 mm and 2 mm, respectively.

The portion of the magnetic tape controller 5 excluding the magnetic tape attracting opening 5A is a magnetic tape contact surface 5B having contact with the magnetic tape 2. The magnetic tape contact surface 5B has a surface roughness of the maximum height from a centerline of not less than 0.8 $\mu$m in order to prevent the phenomenon of adhesion to the magnetic tape 2. The centerline of the surface 5B is such a line on which the protrusions and recesses on the cross-sectional surface become equal in area to each other.

Figure 5:
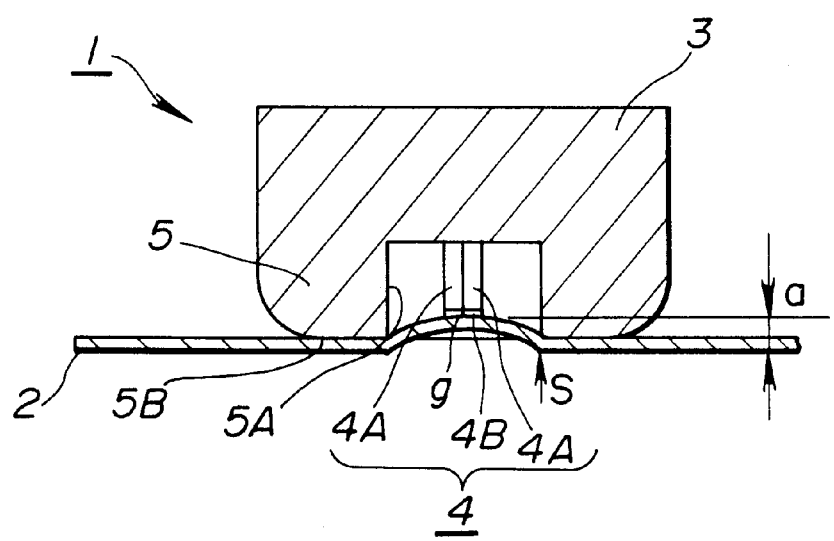
FIG. 5 is a schematic plan view showing the state in which the magnetic head apparatus has attracted the running magnetic tape.
Figure 6:
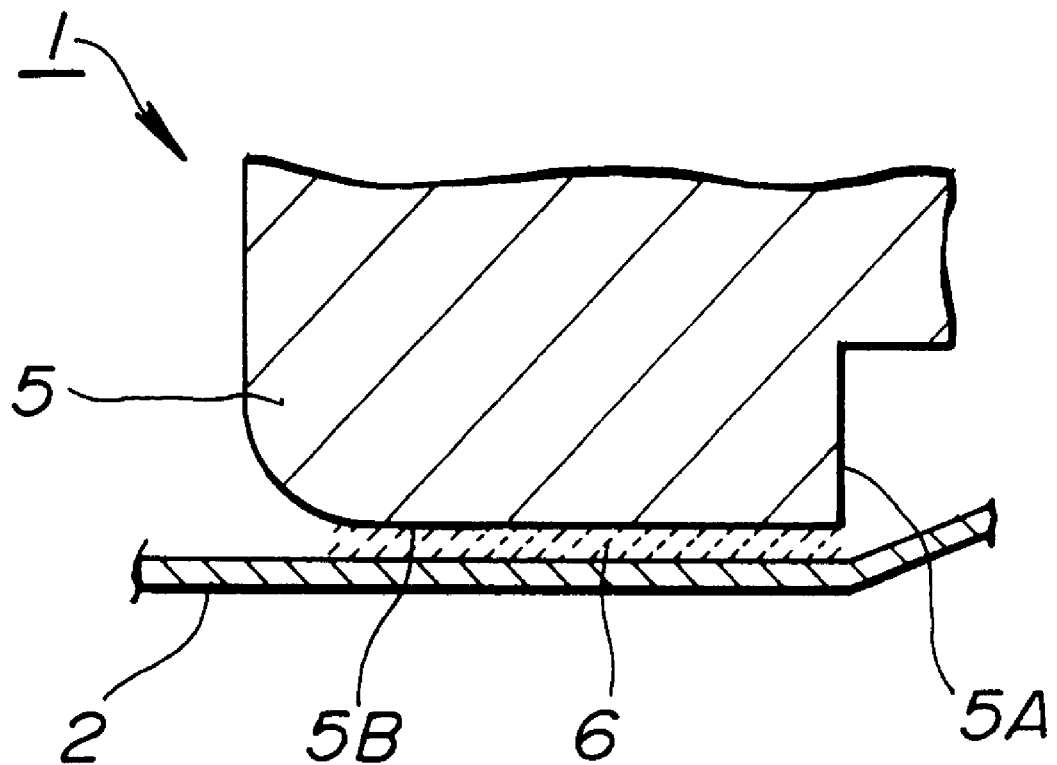
FIG. 6 is a schematic plan view showing the state in which an air film layer has been produced between the magnetic head apparatus and the running magnetic tape.

With the above-described first embodiment of the magnetic head apparatus 1, if the data cartridge is loaded on the inside of the cartridge insertion aperture of the driving apparatus, as shown in FIG. 5, the contact surface 5B of the magnetic tape controller 5 is slightly contacted with the magnetic tape 2, so that the magnetic tape attracting opening 5A is closed by the magnetic tape 2. If the magnetic tape 2 is run with a slight contact with the contact surface 5B, a difference in atmospheric pressure is produced at the magnetic tape attracting aperture 5A on both sides of the magnetic tape 2 so that the magnetic tape 2 is attracted with an attraction width a of 0.01 to 0.08 mm, as indicated by arrow S in FIG. 5. The magnetic tape slide end face 4B of the magnetic head element 4 of the magnetic head apparatus 1 is contacted with the magnetic tape 2 attracted to the magnetic tape attracting opening 5A. At this time, an air film layer 6 is produced between the magnetic tape contact surface 5B of the magnetic controller 5 and the running magnetic tape 2, as shown in FIG. 6.

By such attraction of the magnetic tape 2 by the magnetic tape attraction opening 5A, the oscillations of the magnetic tape 2 in the direction of tape tension and tape width and in the tape running direction are attenuated. It has been shown from the results of experiments that, with the magnetic head apparatus 1, the oscillations of the magnetic tape 2 in terms of the output voltage value as measured by an optical displacement sensor are decreased to one third as compared to the same value obtained with a conventional magnetic head.

Figure 7:
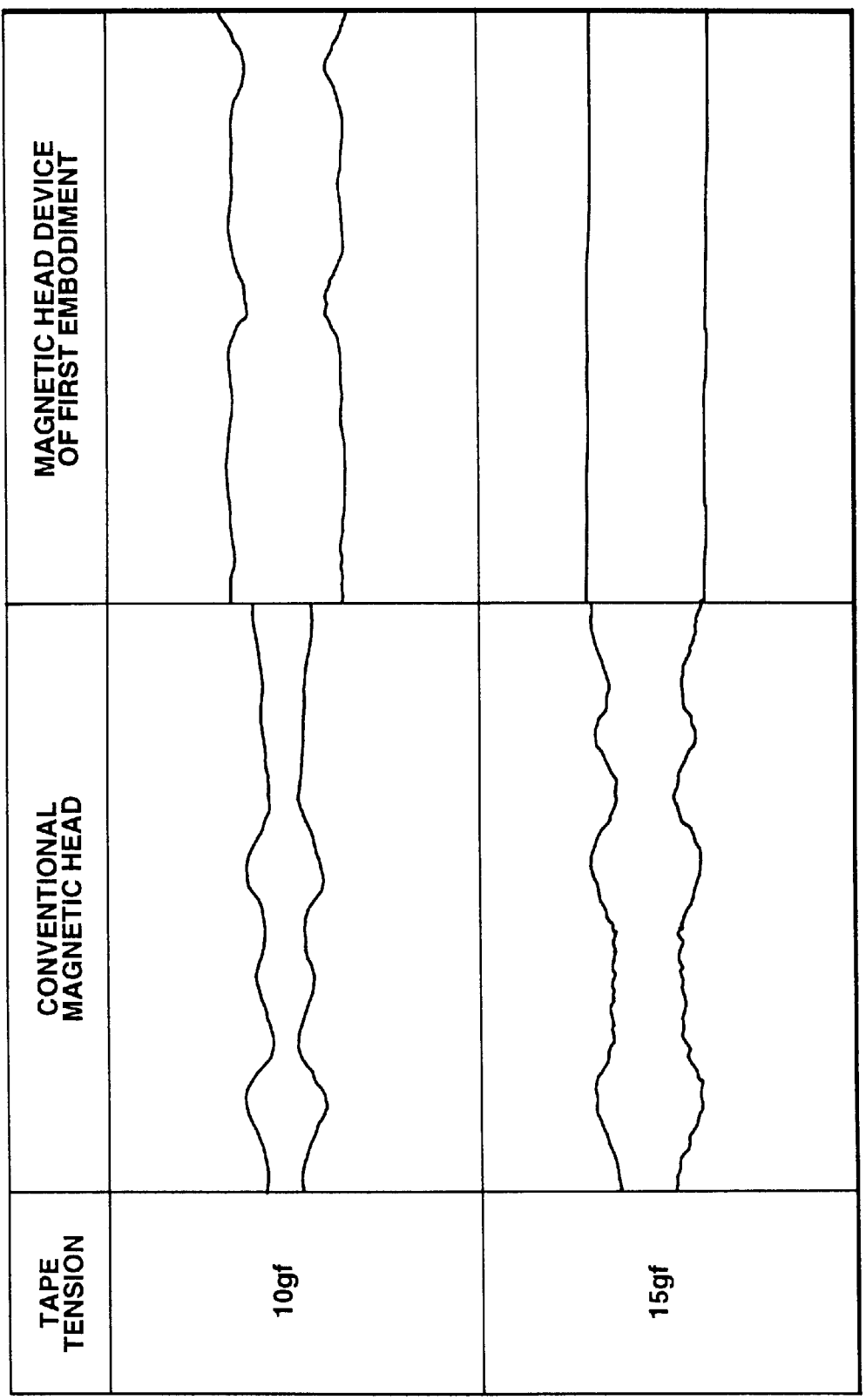
FIG. 7 is a graph showing the degree of contact of the magnetic head apparatus with the magnetic tape in the direction of tape tension.

It has also been shown from the results of experiments that, with the magnetic head apparatus, the contact area with the magnetic tape 2 may be maintained at a constant larger value under an adverse condition of a smaller value of the tape tension as a resistant force exerted by the magnetic tape 2. These results of experiments are obtained from FIG. 7 showing the contact area of the magnetic tape 2 with the conventional magnetic head and with the magnetic head 1 of the first embodiment in the direction of tape tension, with the values of the tape tension, as the force of resistance by the magnetic tape 2 of 10 gf and 15 gf, respectively.

With the conventional magnetic head, only a small value of the contact area with the magnetic tape 2 may be obtained with the tape tension of not more than 15 gf. It may be seen that, with the magnetic head apparatus of the first embodiment, the contact area with the magnetic tape 2 may be maintained at a constant larger value even with the tape tension as low as 10 gf.

Thus the magnetic head device 1 performs positive recording or readout of data signals on or from the magnetic tape 2 by the magnetic head element 4 having contact at the magnetic tape slide end surface 4B thereof with the magnetic tape 2.

With the above-described first embodiment of the magnetic head apparatus 1, since the oscillations of the magnetic tape 2 in the direction of the tape tension and width and in the tape running direction may be controlled by attraction of the running magnetic tape 2 by the magnetic tape attracting opening 5A, recording/reproducing characteristics of the magnetic tape 2 may be improved, while data errors may be prevented from occurrence.

Since the magnetic tape 2 is run in stability, the recording frequency may be set to a higher value, while the recording capacity may also be increased.

Figure 8:
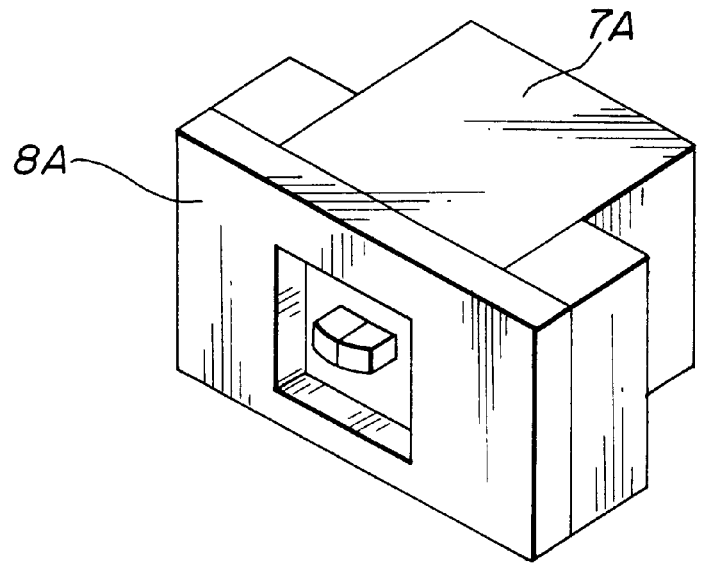
FIG. 8 is a perspective view showing a first modification of the magnetic head apparatus.
Figure 9:
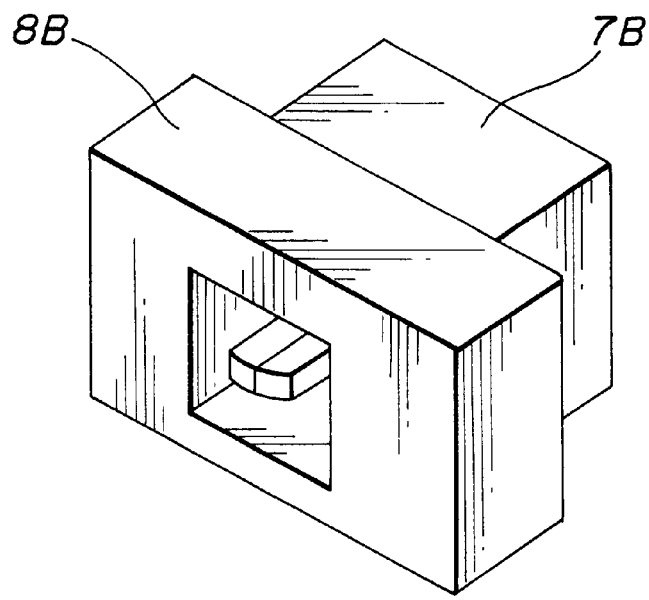
FIG. 9 is a perspective view showing a second modification of the magnetic head apparatus.

With the first embodiment of the magnetic head apparatus 1, the magnetic tape controller 5 is formed integrally with the base portion 3. It is however possible to form magnetic tape controlling members 8A, 8B as separate members from base members 7A, 7B and to attach the magnetic tape controlling members 8A, 8B to the base members 7A, 7B, respectively, as shown in FIGS. 8 and 9.

The first embodiment of the magnetic head apparatus 1 may be applied to a variety of tape cartridges, such as an audio tape cassette, in which magnetic tapes with tape width of, for example, 8 mm, wound on tape reels, are housed, in addition to the tape cartridges described above.

A recording/reproducing apparatus 11, as a second embodiment of the present invention, includes a driving apparatus 12 connected to a computer for sucking up or feeding back data signals stored in a memory of a main body portion, and a data cartridge 13 loaded on the driving apparatus 12 and housing a magnetic tape 26 of a width of ¼ inch, as shown in FIGS. 10 to 14.

Figure 10:
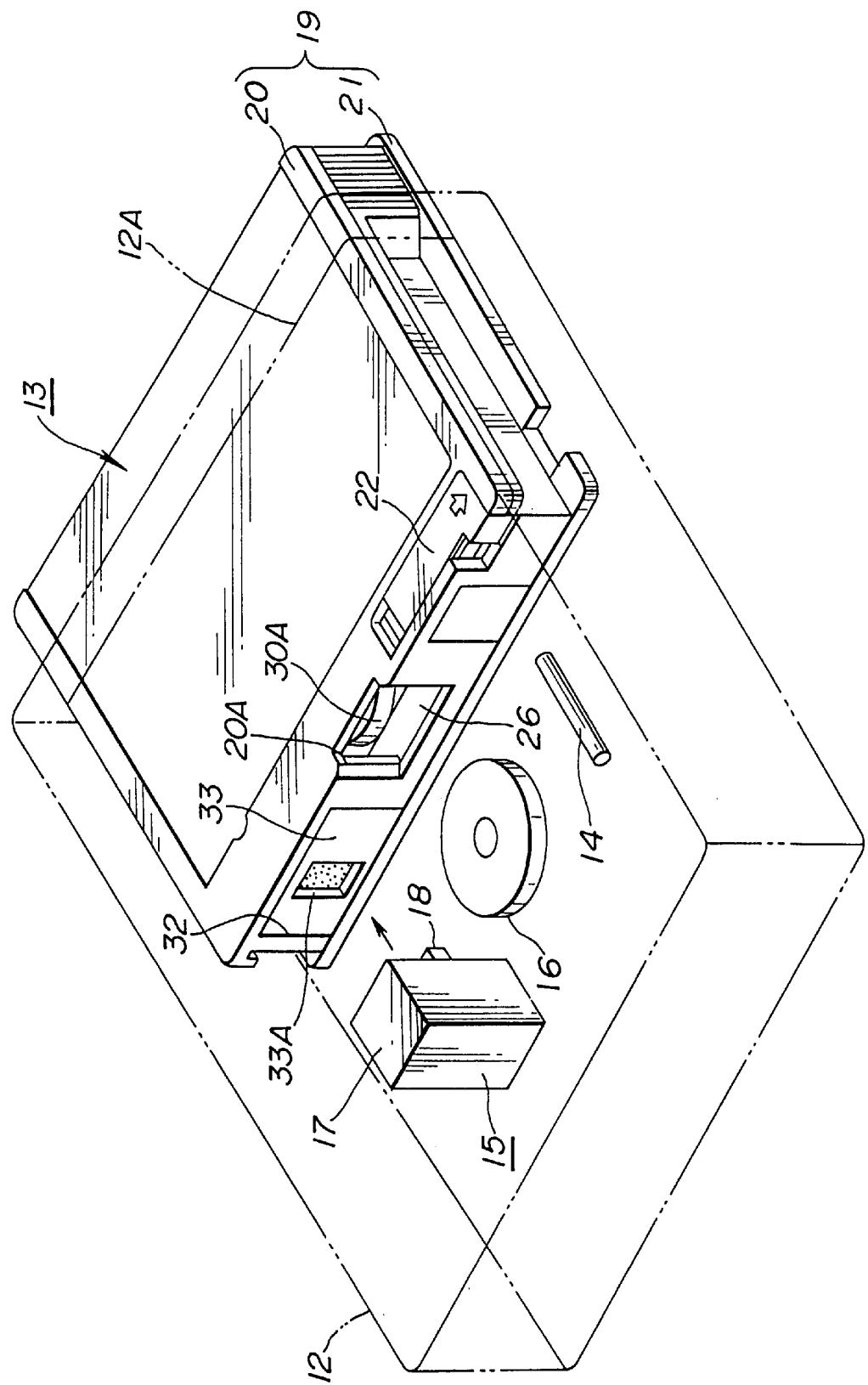
FIG. 10 is a schematic perspective view showing a recording/reproducing apparatus according to a second embodiment of the present invention.
Figure 11:
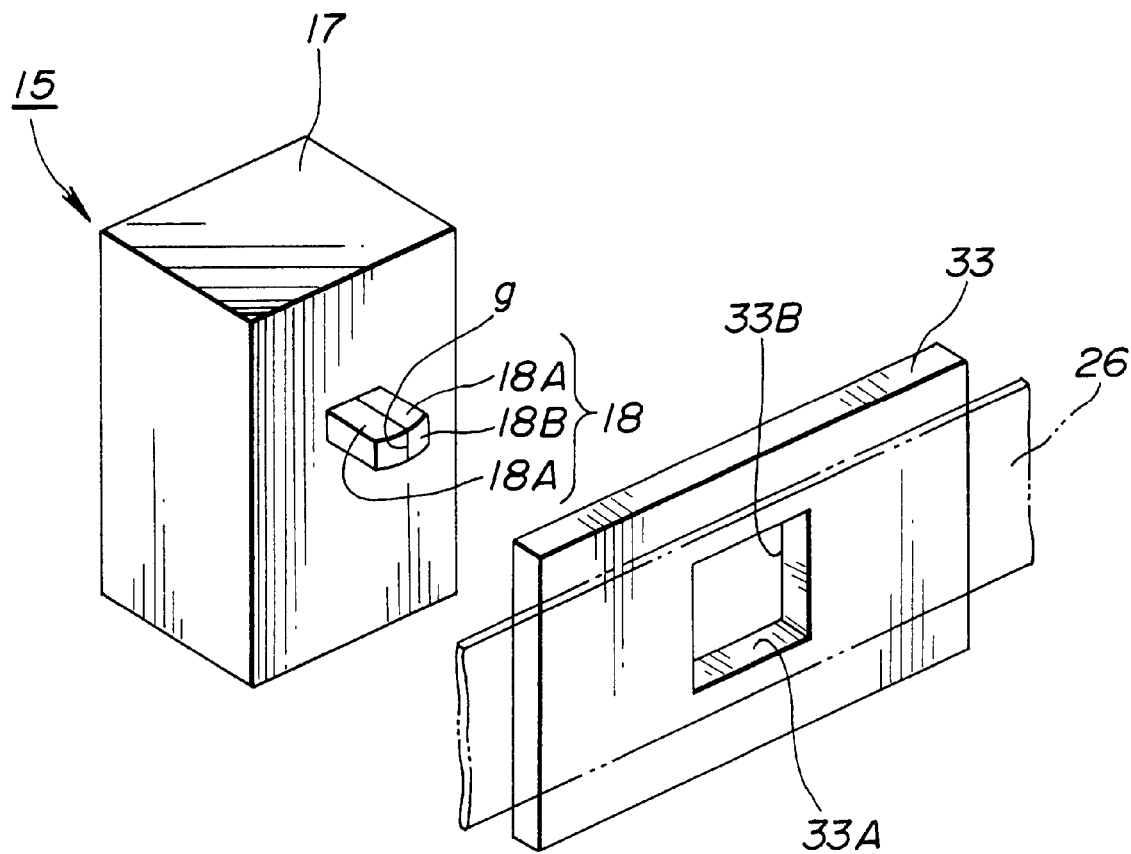
FIG. 11 is a schematic perspective view showing a magnetic head apparatus and a magnetic tape controller of the recording/reproducing apparatus.

The driving apparatus 12 includes, in the inside of the cartridge inserting opening 12A, a mistaken recording detection member 14 constituting a mistaken recording inhibiting mechanism, a magnetic head device 15 for recording or reading data signals on or from the magnetic tape 26, and a driving roll 16 for driving a tape driving mechanism, as shown in FIG. 10. The driving apparatus is known per se and other components thereof are not described for brevity.

The magnetic head device 15 is mounted vertically movably on the driving apparatus 12 and includes a base portion 17 and a magnetic head element 18 mounted upright on a major surface of the base portion 17, as shown in FIG. 10. The base portion 17 is formed of a non-magnetic material as a substantially parallelepipedic member. The base portion 17 has a height larger than the width of the magnetic tape 26.

The magnetic head element 18 includes a pair of magnetic core halves 18A, 18A formed of a magnetic material, such as sendust, permalloy, ferrite or amorphous. The magnetic core halves 18A, 18A of the magnetic head element 18 are formed symmetrically transversely with the abutment surfaces thereof as a boundary surface and are bonded together on the abutment surfaces of the magnetic core halves for completing a closed magnetic path. The magnetic head element 18 has a magnetic gap g on the abutment surfaces of the magnetic core halves 18A, 18A for operating as a recording/reproducing gap. The magnetic head element 18 has a magnetic tape slide end surface 18B ground for having contract with the magnetic tape 26.

A thin sheet of a gap spacer, formed of a non-magnetic material, such as titanium or beryllium copper, may be interposed in the magnetic gap g of the magnetic head element 18 for raising the magnetic field intensity.

Figure 12:
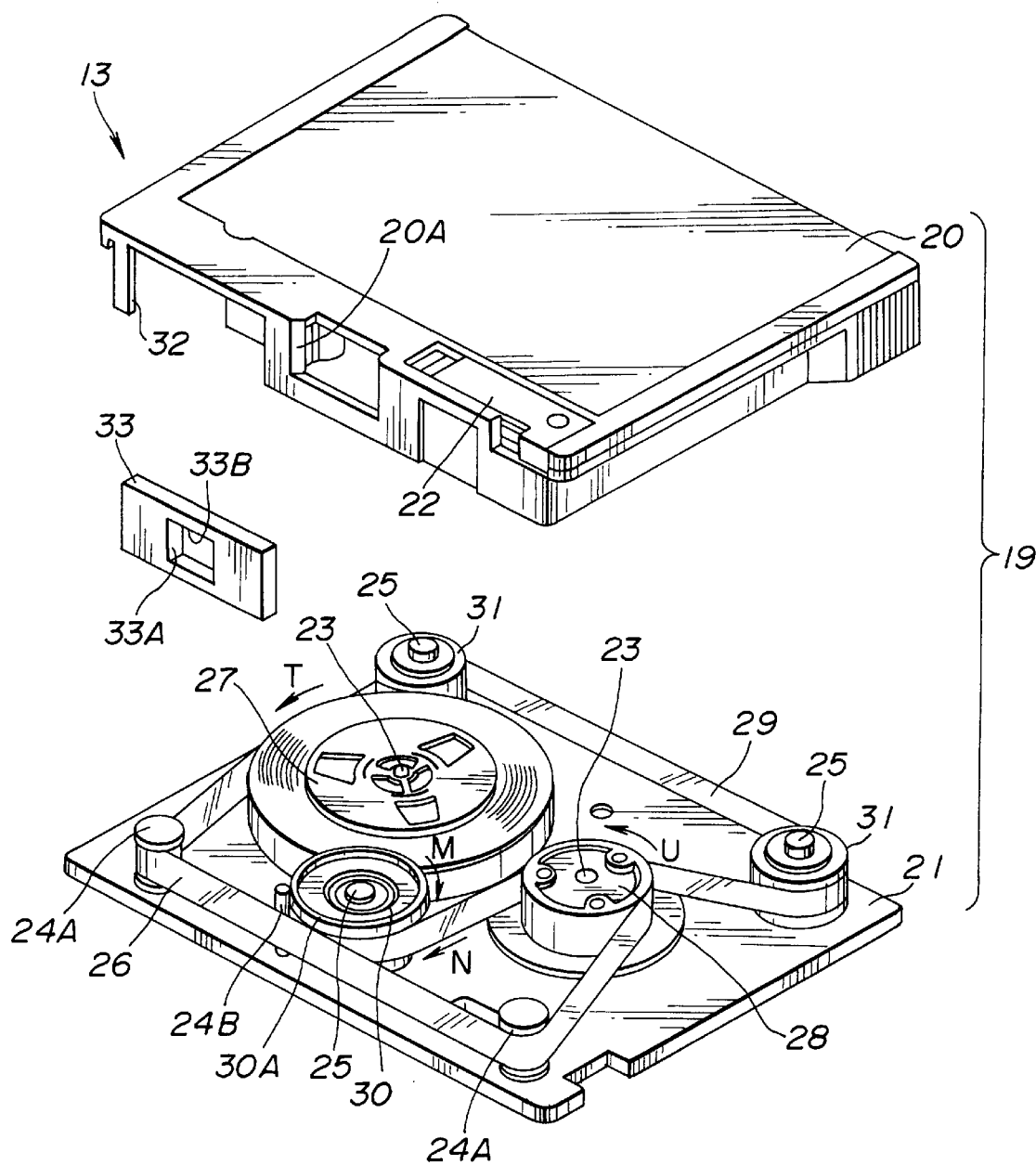
FIG. 12 is a perspective view showing an internal structure of a data cartridge of the recording/reproducing apparatus.

The data cartridge 13 has a cartridge main body portion 10 which is made up of a cover 20 of a synthetic resin material, such as polycarbonate resin, substantially in the form of a shallow saucer, and a base plate 21, formed by a metal plate, such as an Al plate, as shown in FIG. 12. The cover 20 is provided on the front upper surface thereof with a mistaken recording inhibiting member 22 for inhibiting mistaken erasure of data signals recorded on a magnetic tape 26.

On the inner surface of the cartridge main body portion 19, there are set upright a pair of reel pins 23, tape guide pins 24A, 24B and roll pins 25. On the reel pins 23, a tape supply reel 27 and a tape take-up reel 28, about which a magnetic tape 26 having a tape width of 6.35 mm, a tape thickness of 10 $\mu$m and a tape length of 95 m, for example, is wound. The magnetic tape 26 is placed around the tape guide pins 24A, 24B. On the roll pins 25 are rotatably supported a belt driving roll 30 and a pair of belt guide rolls 31 about which is wound an endless belt 29 adapted for rotationally driving the tape supply reel 27 and the tape take-up reel 28.

The belt driving roll 30 is formed of an abrasion-resistant elastic material and is formed at it upper edge portion with a driving flange 30A for having rolling contact with the driving roll 16 on the driving apparatus 12 for rotation transmission.

In the front surface of the cartridge main body portion 19 is formed a mounting aperture 32 for mounting a magnetic tape controlling member 33. The mounting aperture is formed by a cut-out formed at the forward edge of the cover 20. In this mounting aperture 32 is mounted the magnetic tape controlling member 33 by press-fit, adhesion or caulking.

The magnetic tape controlling member 33 is formed as a substantially rectangular plate having a height slightly smaller than the thickness of the cartridge main member 19. The magnetic tape controlling member 33 has a thickness slightly larger than the length of the magnetic head element 18 from the proximal portion to the distal end portion thereof. In this magnetic tape controlling member 33 is formed a magnetic tape attracting aperture 33A of a substantially rectangular cross-section through which the magnetic tape slide end surface 18B of the magnetic head element 18 of the magnetic head device 15 is introduced and which is closed from outside by the base portion 17 of the magnetic head device 15.

The magnetic head attracting aperture 33A has an inner size larger than the outer diameter of the magnetic head element 18 of the magnetic head device 15 and which is closed by the base portion 17 by vertical movement of the magnetic head device 15. The magnetic tape attracting aperture 33A has a height equal to or smaller than the width of the magnetic tape 26.

The magnetic tape attracting aperture 33A has a depth slightly larger than the length from the proximal end to the distal end of the magnetic head element 18 and is set so that the magnetic head element 18 will be protruded to an optimum extent in agreement with the recording frequency or the coercive force Hc of the magnetic tape 26. The magnetic tape subtracting opening 33A has a height, width and depth of, for example, 4 mm, 2 mm and 2 mm, respectively.

The magnetic tape controlling member 33 is set upright on the rim of the magnetic tape attracting aperture 33A so that a magnetic tape contact protrusion 33B contacted with the magnetic tape 26 is directed towards the magnetic tape 26. Preferably, the magnetic tape contact protrusion 33B is disposed at a distance of not more than approximately 1 mm as measured from the distal end to the magnetic tape 26 and is contacted with the magnetic tape 26 with such a contact that surface friction is not increased significantly.

The magnetic tape contact protrusion 33B has a surface roughness of the maximum height from a centerline of not less than 0.8 $\mu$m in order to prevent the phenomenon of adhesion to the magnetic tape 2. The centerline of the surface 33B is such a line on which the protrusions and recesses on the cross-sectional surface become equal in area to each other.

With the above-described second embodiment of the recording/reproducing apparatus 11, the data cartridge 13 may be loaded in the inside of the cartridge insertion opening 12A of the driving apparatus 12, as shown in FIG. 10, as a result of movement of the mistaken recording inhibiting member 12, with the mistaken recording inhibiting member 22 closing a mistaken recording detection opening, not shown. Recording of data signals on the magnetic tape 26 in the data cartridge 13 by the magnetic head device 15 is permitted by the mistaken recording detection member 14 in the driving apparatus 12 being prohibited from entering the recording detection opening.

Figure 13:
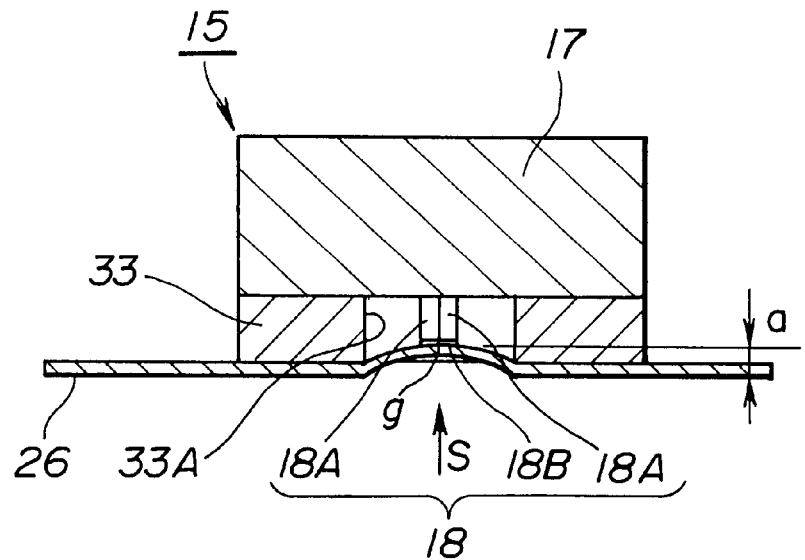
FIG. 13 is a schematic plan view showing the state in which the magnetic head apparatus and the magnetic tape controller of the recording/reproducing apparatus have attracted the magnetic tape.
Figure 14:
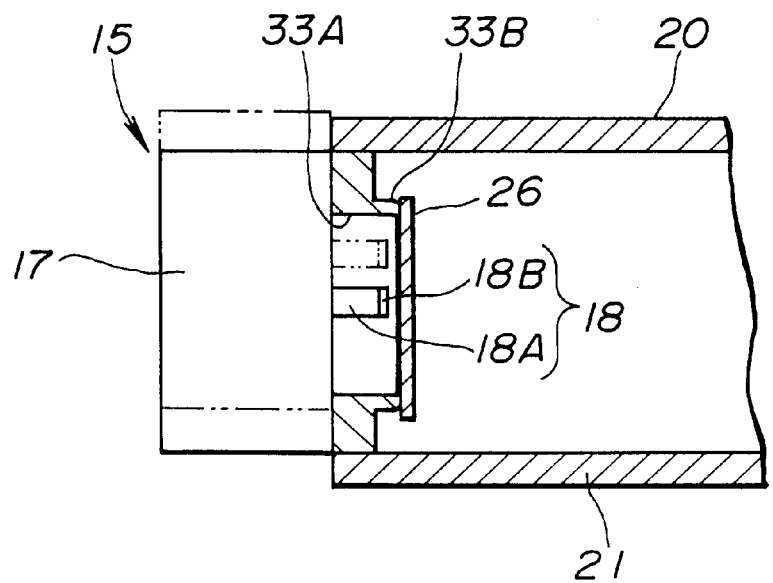
FIG. 14 is a schematic longitudinal cross-sectional view showing the state of contact between the magnetic head apparatus and the magnetic tape controller of the recording/reproducing apparatus.

The magnetic head element 18 of the magnetic head device 15 of the recording/reproducing apparatus 11 is intruded into the magnetic tape attracting aperture 33A of the data cartridge 13, as shown in FIGS. 13 and 14. At this time, the base portion 17 of the magnetic head device 15 is contacted with the magnetic tape controlling member 33 of the data cartridge 13 of the recording/reproducing apparatus for closing the magnetic tape attracting aperture 33A of the magnetic tape controlling member 33 from outside.

In the recording/reproducing apparatus 11, the driving roll 16 on the driving apparatus 12 is intruded via the driving opening in the data cartridge 13 into contact with the driving flange 30A of the driving roll 30 with the magnetic tape 26 and the endless belt 29 in-between.

With rotation of the driving roll 16 of the driving apparatus 12, the belt driving roll 30 of the data cartridge 13 of the recording/reproducing apparatus 11 is rotated clockwise as indicated by arrow M in FIG. 12. By such rotation of the belt driving roll 30, the endless belt 29 in its entirety is rotated clockwise as indicated by arrow M in FIG. 12.

With the data cartridge 13, the tape supply reel 27 is rotated by rotation of the endless belt 29 counterclockwise as indicated by arrow T in FIG. 12 for reeling out the magnetic tape 26 from the taken-up state along the front surface of the cartridge main body portion 19. The tape take-up reel 28 is rotated counterclockwise as indicated by arrow U in FIG. 12 for taking up the reeled-out magnetic tape 26.

As the magnetic tape 26 of the data cartridge 13 travels as described above, the atmospheric pressure difference is produced across the magnetic tape 26 by the magnetic tape attraction aperture 33A in the magnetic tape controlling member 33. Thus the magnetic tape 26 is attracted with an amount of attraction a equal to 0.01 mm to 0.08 mm in a direction indicated by arrow S in FIG. 13 into contact with the slide end surface 18B of the magnetic head element 18 of the magnetic head device 15. At this time, an air film layer is produced between the magnetic tape contact protrusion 33B of the magnetic tape controlling member 33 and the running magnetic tape 26.

By magnetic attraction of the magnetic tape 26 by the magnetic tape attraction aperture 33A of the data cartridge 13, the oscillations of the magnetic tape 26 in the direction of tape tension and tape width and in the tape running direction are attenuated. It has been shown from the results of experiments that, with the magnetic head apparatus 11, the oscillations of the magnetic tape 2 in terms of the output voltage value as measured by an optical displacement sensor are decreased to one third as compared to the same value obtained with a conventional magnetic head.

It has also been shown from the results of experiments that, with the magnetic head apparatus, the contact area with the magnetic tape 26 may be maintained at a constant larger value under an adverse condition of a smaller value of the tape tension as a resistant force exerted by the magnetic tape 26.

Thus it is possible with the recording/reproducing apparatus 11 to record or read out data signals on or from the magnetic tape 26 reliably by the magnetic heads element 18 of the magnetic head device 15 having its slide end surface 18B contacted with the magnetic tape 26.

With the recording/reproducing apparatus 11, the magnetic head device 15 of the driving apparatus 12 is shifted along the tape width depending upon the running direction of the magnetic tape 26 driven bi-directionally between the tape supply reel 27 and the tale take-up reel 28 of the data cartridge 13, as shown in FIG. 13. Thus the upper and lower track portions of the magnetic tape 26 may be scanned selectively for recording or reading out the data signals.

In the above-described second embodiment of the recording/reproducing apparatus 11, the magnetic tape attracting aperture 33A of the magnetic tape controlling member 33 mounted on the data cartridge 13 attracts the running magnetic tape 26 for controlling oscillations of the magnetic tape 26 in the direction of tape tension and tape width and in the tape running direction for stabilizing recording/reproducing characteristics of the magnetic tape 26 for positively prohibiting data errors from occurrence.

Since the magnetic tape 26 of the data cartridge 13 is run in a stabilized state, the recording frequency can be set to a higher value, while the recording capacity may be increased.

The above-described second embodiment of the recording/reproducing apparatus 11 can be applied not only to the above-described data cartridge 132 but to a variety of tape cartridges, such as audio cassettes, in which are housed 8-mm wide magnetic tapes wound on tape reels.

With the magnetic head device of the present invention, as described above, the tape oscillations in the direction of tape tension and tape width and in the tape running direction may be attenuated for stabilizing recording/playback characteristics and preventing data errors from occurrence.

Thus it becomes possible with the magnetic head device to set the recording frequency for the magnetic tape to a higher value for improving the recording capacity and recording quality.

In addition, with the tape cartridge according to the present invention, off-tracks of the magnetic tape with respect to the magnetic head on the recording/reproducing apparatus may be attenuated for stabilizing the recording/playback performance of the magnetic head for the magnetic tape for preventing data errors and improving the recording quality.

Thus, with the tape cartridge, the recording frequency can be set to a higher value and the recording capacity may be increased for improving the recording quality.

With the recording/reproducing apparatus according to the present invention, the tape oscillations in the direction of tape tension and tape width and in the tape running direction may be attenuated for stabilizing recording/playback characteristics and preventing data errors from occurrence.

Thus it becomes possible with the recording/reproducing apparatus to set the recording frequency for the magnetic tape to a higher value for improving the recording capacity and recording quality.

What is claimed is:

1. A magnetic head apparatus comprising: a base portion;
   a magnetic head element protuberantly formed on one major surface of the base portion and having a magnetic core with a magnetic gap;
   magnetic tape controlling means formed on said major surface of the base portion, comprising a uniform control surface that completely and laterally surrounds said magnetic head element, and contacts a magnetic tape; and
   a rectangular magnetic tape attracting aperture formed in said magnetic tape controlling means for exposing a tape slide surface of the magnetic head element to outside, said tape attracting aperture having outer boundary edges which together with said control surface form a plane,
   the running tape being attracted by an atmospheric pressure differential on each side of said magnetic tape, via said magnetic tape attracting aperture, into contact with the tape slide surface of the magnetic head element, and the magnetic head element being positioned entirely between the plane of said tape attracting aperture outer boundary edges and the major surface of the base portion on which said magnetic head element is protuberantly formed.

2. The magnetic head apparatus according to claim 1, wherein said magnetic tape attracting aperture is formed in said control surface.

3. A magnetic head apparatus according to claim 1, wherein said rectangular magnetic tape attracting aperture comprises two edges disposed parallel with said magnetic gap, and two edges disposed perpendicular to said magnetic gap.

4. A magnetic head apparatus according to claim 3, wherein said two edges disposed parallel with said magnetic gap, and said two edges disposed perpendicular to said magnetic gap, all contact said magnetic tape.

5. A magnetic head apparatus according to claim 3, wherein said two edges disposed parallel to said magnetic gap, and said two edges disposed perpendicular to said magnetic gap, together form one continuous plane parallel to said base portion.

6. A magnetic head device comprising:

a base portion that seals, from outside, a magnetic tape attracting aperture of a tape cartridge having a cartridge main body portion made up of an upper cartridge half and a lower cartridge half, a pair of tape reels rotatably mounted in said cartridge main body portion and a magnetic tape wound about these tape reels, magnetic tape controlling means being provided on one side of the cartridge main body portion for being contacted with the magnetic tape, said magnetic tape attracting aperture being formed in said magnetic tape controlling means for exposing said magnetic tape; and a magnetic head element protuberantly formed on a major surface of the base portion and having a magnetic core with a magnetic gap, a tape slide end surface of the magnetic head element that protrudes into the magnetic tape attracting aperture formed in the tape cartridge, the running magnetic tape being attracted via the magnetic tape attracting aperture into contact with the tape slide end surface of the magnetic head element.

7. A tape cartridge according to claim 6, wherein said magnetic tape attracting aperture pulls said magnetic tape into said aperture to contact said tape slide surface.

8. A tape cartridge comprising:

a cartridge main body portion made up of an upper cartridge half and a lower cartridge half;

a pair of tape reels rotatably mounted in said cartridge main body portion; and a magnetic tape wound about these tape reels having two sides, magnetic tape controlling means, provided on one side of the cartridge main body portion, having a magnetic tape attracting aperture adapted to receive a magnetic tape slide surface of a magnetic head element of a magnetic head device, said magnetic head element having a base portion and a magnetic core formed on a major surface of the base portion with a magnetic gap and to be completely closed by the base portion of the magnetic head device, and by said magnetic tape;

the running magnetic tape being attracted into the magnetic tape attracting aperture by an atmospheric pressure differential on both of said two sides of said magnetic tape, the running magnetic tape being in a position in the magnetic tape attracting aperture to contact the tape slide end surface of the magnetic head element as a result of said atmospheric pressure differential.

9. A recording/reproducing apparatus comprising:

a magnetic head device having a base portion and a magnetic head element protuberantly formed on a major surface of said base portion and having a magnetic core having a magnetic gap; and a tape cartridge having a cartridge main body portion comprising:

an upper cartridge half;

a lower cartridge half;

a pair of tape reels rotatably mounted in said cartridge main body portion;

a magnetic tape wound about said tape reels having two sides; and a magnetic tape controller provided on one side of the cartridge main body portion, in contact with the magnetic tape, wherein said magnetic tape controller comprises a rectangular magnetic tape attracting aperture into which a magnetic tape slide surface of the magnetic head element of the magnetic head device is intruded, and which is closed by the base portion of the magnetic head device, the running magnetic tape being attracted by a pressure differential on both of said two sides of said magnetic tape via the magnetic tape attracting aperture into contact with the tape slide surface.

10. A recording/reproducing apparatus according to claim 9, wherein said rectangular magnetic tape attracting aperture comprises two edges disposed parallel to said magnetic gap, and two edges disposed perpendicular to said magnetic gap.

11. A recording/reproducing apparatus according to claim 10, wherein said two edges disposed parallel with said magnetic gap, and said two edges disposed perpendicular to said magnetic gap, all contact said magnetic tape.

12. A recording/reproducing apparatus according to claim 10, wherein said two edges disposed parallel to said magnetic gap, and said two edges disposed perpendicular to said magnetic gap, together form one continuous plane parallel to said base portion.

* * * * *